(12) United States Patent
Lin

(10) Patent No.: US 8,094,439 B2
(45) Date of Patent: Jan. 10, 2012

(54) LATCHING MECHANISM AND ELECTRONIC DEVICE USING THE SAME

(75) Inventor: Shing-Huei Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 182 days.

(21) Appl. No.: 12/749,631

(22) Filed: Mar. 30, 2010

(65) Prior Publication Data

US 2010/0302742 A1   Dec. 2, 2010

(30) Foreign Application Priority Data

Jun. 1, 2009   (CN) .............................. 200910302815

(51) Int. Cl.
  *H05K 5/00* (2006.01)
  *H05K 7/00* (2006.01)
  *H04M 1/00* (2006.01)
  *G11B 17/00* (2006.01)

(52) U.S. Cl. ......... 361/679.01; 361/679.02; 361/679.55; 361/679.56; 361/679.57; 361/679.58; 455/575.1; 455/575.3; 455/575.4; 455/575.8; 369/253

(58) Field of Classification Search ............. 361/679.01, 361/679.02, 679.55–679.59, 679.27, 740; 455/575.1, 575.3, 575.4, 575.8; 369/282, 369/291, 253, 44.16, 75.5
See application file for complete search history.

(56) References Cited

U.S. PATENT DOCUMENTS 7,751,181 B2 * 7/2010 Chen ........................ 361/679.01
2008/0318646 A1 * 12/2008 Lin ............................ 455/575.4
* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A latching mechanism for a portable electronic device includes a frame, at least one elastic member, a latching member and a button. The frame defines a chamber. The latching member includes a protruding block and a matching body having a slanted plane. The button includes a resisting portion. The elastic member, the latching member and the button are received in the chamber, the elastic member resists against the latching member, the protruding block extends out from the chamber, the resisting portion of the button engages with the slanted plane, the latching member slides when pressing the button and the protruding block can withdraw into the chamber.

14 Claims, 6 Drawing Sheets

LATCHING MECHANISM AND ELECTRONIC DEVICE USING THE SAME

BACKGROUND

1. Technical Field

The disclosure relates to latching mechanisms and electronic devices; and particularly to a latching mechanism to assemble in a portable electronic device to latch a battery.

2. Description of Related Art

Portable electronic devices such as mobile phones are widely used. When a battery is installed in a receiving chamber of the portable electronic device, the battery can be latched by a latching mechanism.

The latching mechanism includes an elastic member protruding at the side of the receiving chamber. When placing the battery into the receiving chamber, an end of the battery compresses the elastic member to help hold the battery in place. Therefore, the battery installs in the receiving chamber and an end resists against the elastic member. When taking the battery from the receiving chamber, the battery further presses the elastic member until an end of the battery can be removed from the receiving chamber.

Therefore, it is inconvenient to install and uninstall the battery from the receiving chamber.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
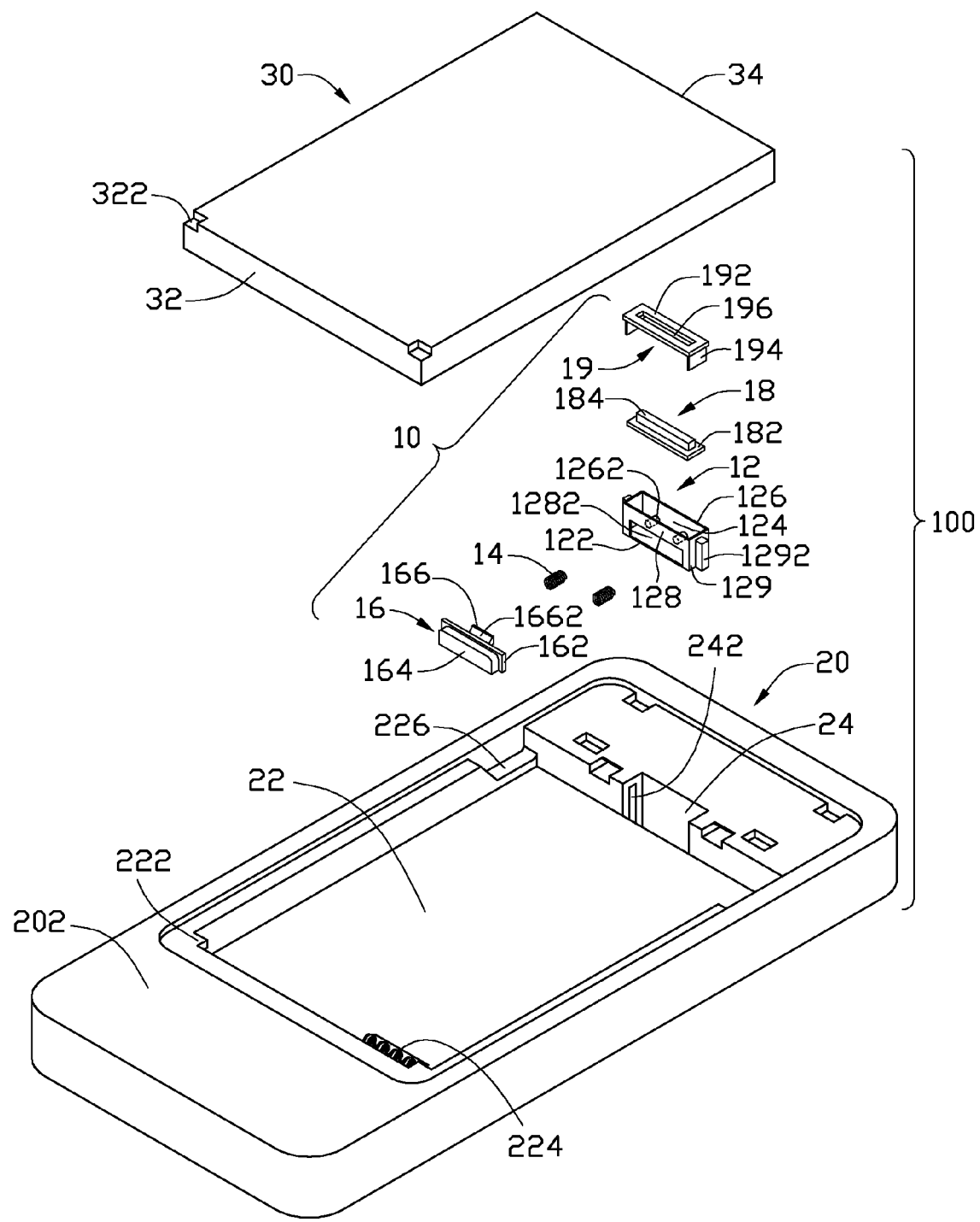
FIG. 1 is an exploded view of a portable electronic device having an exemplary embodiment of a latching mechanism.

The latching mechanism of the disclosure can be used in a portable electronic device such as a mobile phone, PDA (personal digital assistant), etc. FIG. 1 shows an exemplary latching mechanism 10 applied in a mobile phone 100. The mobile phone 100 further includes a housing 20 and a battery 30. The battery 30 can be detachably assembled in the housing 20 using the latching mechanism 10.

The latching mechanism 10 includes a frame 12, two elastic members 14, a latching member 16, a button 18 and a hood 19.

The frame 12 defines a chamber 124 enclosed by a bottom wall 122 and a first side wall 126, a second side wall 128 opposite to the first side wall 126, and two opposite third side walls 129. The first side wall 126 forms two posts 1262 at the inner surface. The two posts 1262 protrude towards the second side wall 128. The second side wall 128 defines a through hole 1282 corresponding to the two posts 1262. Each third wall 129 forms protrusions 1292 on the outer surfaces. The protrusions 1292 extend laterally and latch with the housing 20.

The elastic members 14 can be a coiled spring, an elastic sponge etc. The elastic members 14 can be placed around the posts 1262 and resist against the latching member 16 after the latching member 16 is received in the chamber 124.

The latching member 16 includes a plate portion 162, a protruding block 164 connecting at a side of the plate portion 162, and a matching body 166 connecting the opposite side to the plate portion 162. The plate portion 162 has a slightly larger size than the hole 1282, and therefore, cannot pass through the hole 1282. The protruding block 164 is engagable with the hole 1282. The matching body 166 is substantially wedge-shaped and has a slanted plane 1662 engaging with the button 18. After the latching member 16 is assembled in the chamber 124 of the frame 12, a side of the plate portion 162 abuts against the inner side of the second side wall 128 and the protruding block 164 protrudes from the hole 1282. The two elastic members 14 resist against the other side of the plate portion 162. The latching member 16 slides towards the first side wall 126 when pressing against the protruding block 164, and the elastic member 14 is compressed until the protruding block 164 is received in the chamber 124.

Figure 2:
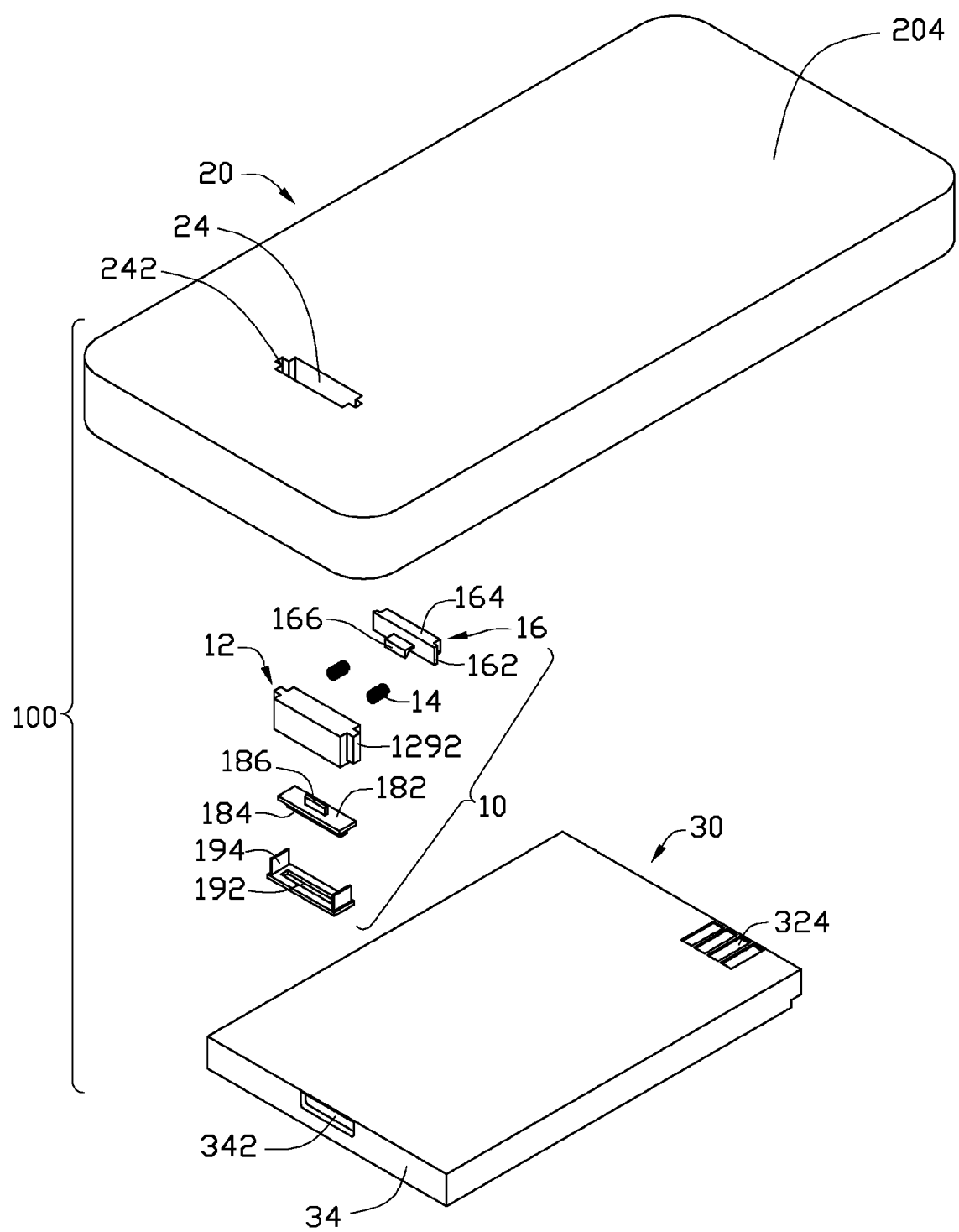
FIG. 2 is an exploded view shown in FIG. 1 from another view angle.

The button 18 includes a base plate 182, a pressing portion 184 on the top surface of the base plate 182, and a resisting portion 186 protruding from the bottom surface of the base plate 182 (best seen in FIG. 2). The base plate 182 is received in the chamber 124. The pressing portion 184 can be pressed by the user and is engageable with the hood 19. The resisting portion 186 resists the slanted plane 1662 of the matching body 166.

The hood 19 covers the chamber 124 and engages with the button 18. The hood 19 includes a hood plate 192 and two side flanges 194 respectively adjacent to two ends of the hood plate 192, protruding from the bottom surface of the hood plate 192. The hood plate 192 defines a slot 196 engaging the pressing portion 184 of the button 18. The two side flanges 194 can be inserted into the chamber 124 and respectively resist with the inner side of the third side walls 129.

Referring to FIGS. 1 and 2, the housing 20 has a first surface 202 and an opposite second surface 204. The housing 20 defines a recess 22 in the first surface 202 and forms two holding ribs 222 at an end of the recess 22. The recess 22 is configured for receiving the battery 30. Each holding rib 222 is located at two corners of the recess 22 and are spaced above the bottom surface of the recess 22. The holding ribs 222 hold an end of the battery 30. Accordingly, an elastic connector 224 is formed at the corner of the recess 22 corresponding to one of the holding ribs 222. The connector 224 includes a plurality of elastic pins that electronically connect with the battery 30. Two opposite notches 226 are defined at two sides of the recess 22 adjacent to the other corners of the recess 22 respectively. Each notch 226 communicates with the recess 22 and can be used to remove the battery 30 from the recess 22. The housing 20 also defines a receiving groove 24 and two guiding slits 242 at the two opposite sidewalls of the receiving groove 24. The receiving groove 24 is adjacent to the recess 22 and passes through the housing 20. The receiving groove 24 corresponds to the latching mechanism 10 in size and is used to assemble the latching mechanism 10 therein. Two guiding slits 242 extend from the second surface 204 and do not communicate with the first surface 202, the guiding slits 242 engage with the two protrusions 1292 of the frame 12.

The battery 30 includes a first end wall 32 and an opposite second end wall 34. The first end wall 32 defines a rectangular cutout 322 at each of the two corners. Each cutout 322 connects a top surface and a side surface of the battery 30, engaging with the holding rib 222 of the housing 20. The second end wall 34 has a cavity 342 formed therein. The cavity 342 is used to engage with the protruding block 164 of the latching member 16. The battery 30 defines connecting pins 324 at the bottom surface, adjacent to the first end wall 32. The connecting pins 324 electronically connect with the connector 224.

Figure 3:
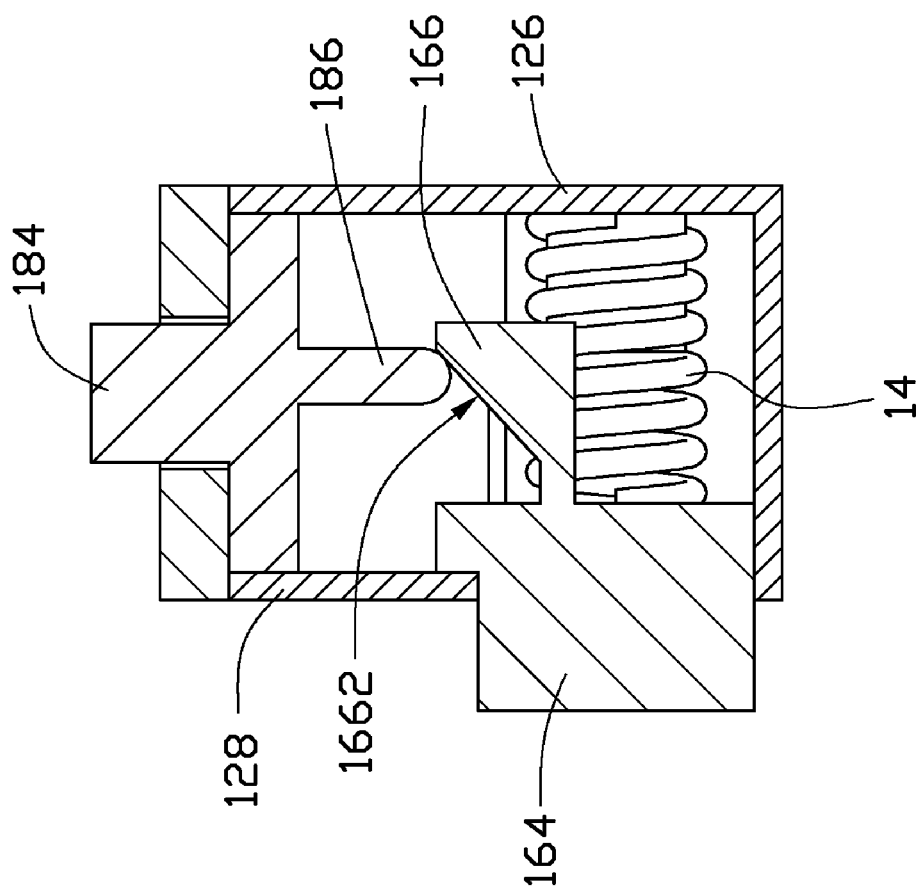
FIG. 3 is an assembled sectional view of the latching mechanism shown in FIG. 1.

Referring to FIG. 3, to assemble the latching mechanism 10, the two elastic members 14 pass through the hole 1282 of the second side wall 128 and around the two posts 1262 of the first side wall 126. The latching member 16 is placed into the chamber 124 of the frame 12. The plate portion 162 abuts the inner side of the second side wall 128 and the protruding block 164 protrudes from the hole 1282, the two elastic members 14 are compressed between the plate portion 162 and the first side wall 126. The button 18 is positioned into the chamber 124 and the resisting portion 186 resists against the slanted plane 1662 of the latching member 16. The pressing portion 184 of the button 18 protrudes from the chamber 124. The hood 19 is assembled in the frame 12, and the two side flanges 194 are inserted into the chamber 124 and each side flange 194 correspondingly resists against the inner side of the third side wall 129. The pressing portion 184 passes through the slot 196 of the hood plate 192 and is exposed to the outside. Thus, the assembly of latching mechanism 10 is finished.

Figure 4:
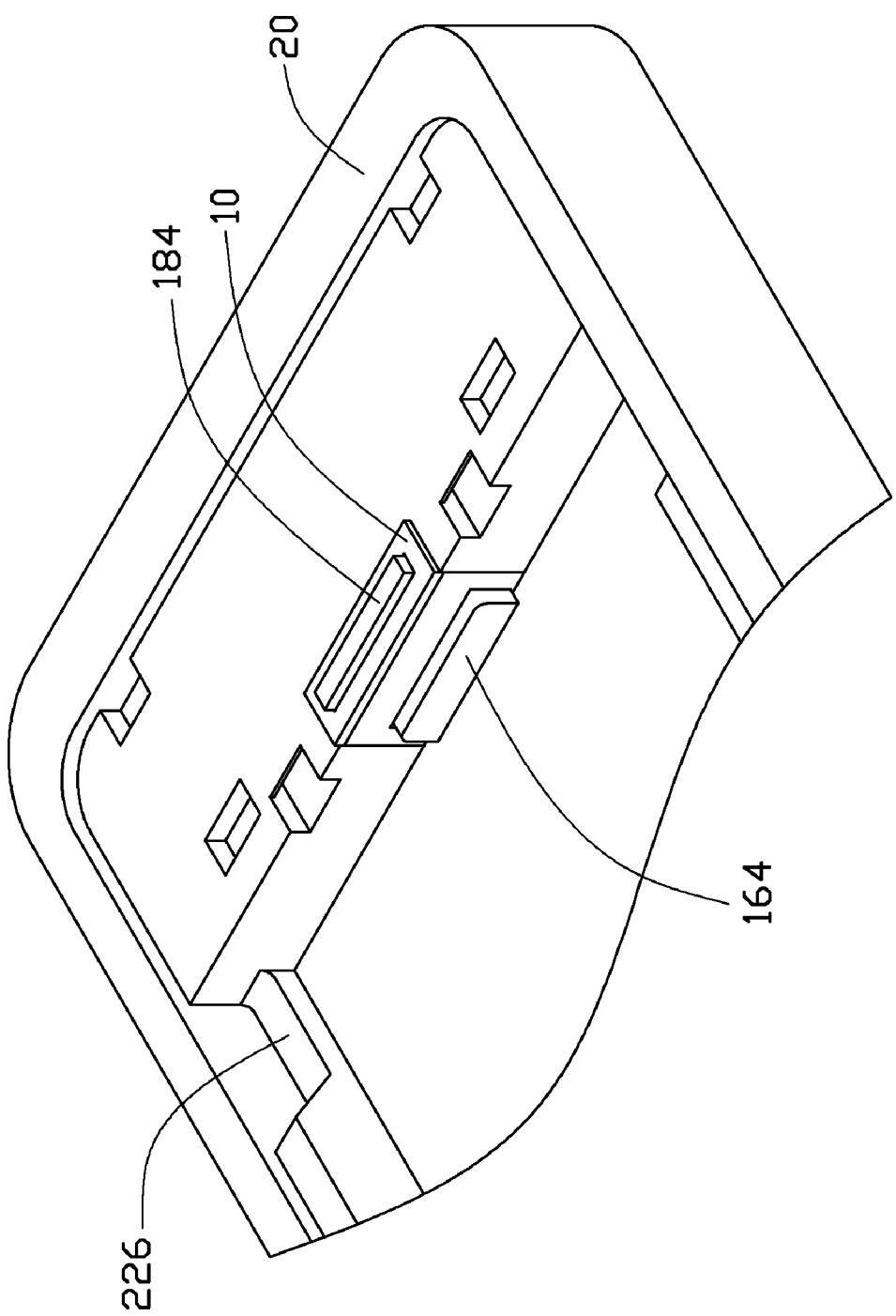
FIG. 4 is a partial view of the portable electronic device after the latching mechanism assembles shown in FIG. 1.

To assemble the latching mechanism 10 into the housing 20, the protruding block 164 is pressed until the protruding block 164 withdraws into the chamber 124. Thus, the latching mechanism 10 is assembled into the receiving groove 24 from the second surface 204 of the housing 20. The two protrusions 1292 of the frame 12 slide along the guiding slits 242. The protruding block 164 cannot extend out from the hole 1282 when it is compressed in the receiving groove 24. Referring to FIG. 4, the protruding block 164 can pass through the hole 1282 to the recess 22 by the elastic members 14 when the protruding block 164 is assembled.

Figure 5:
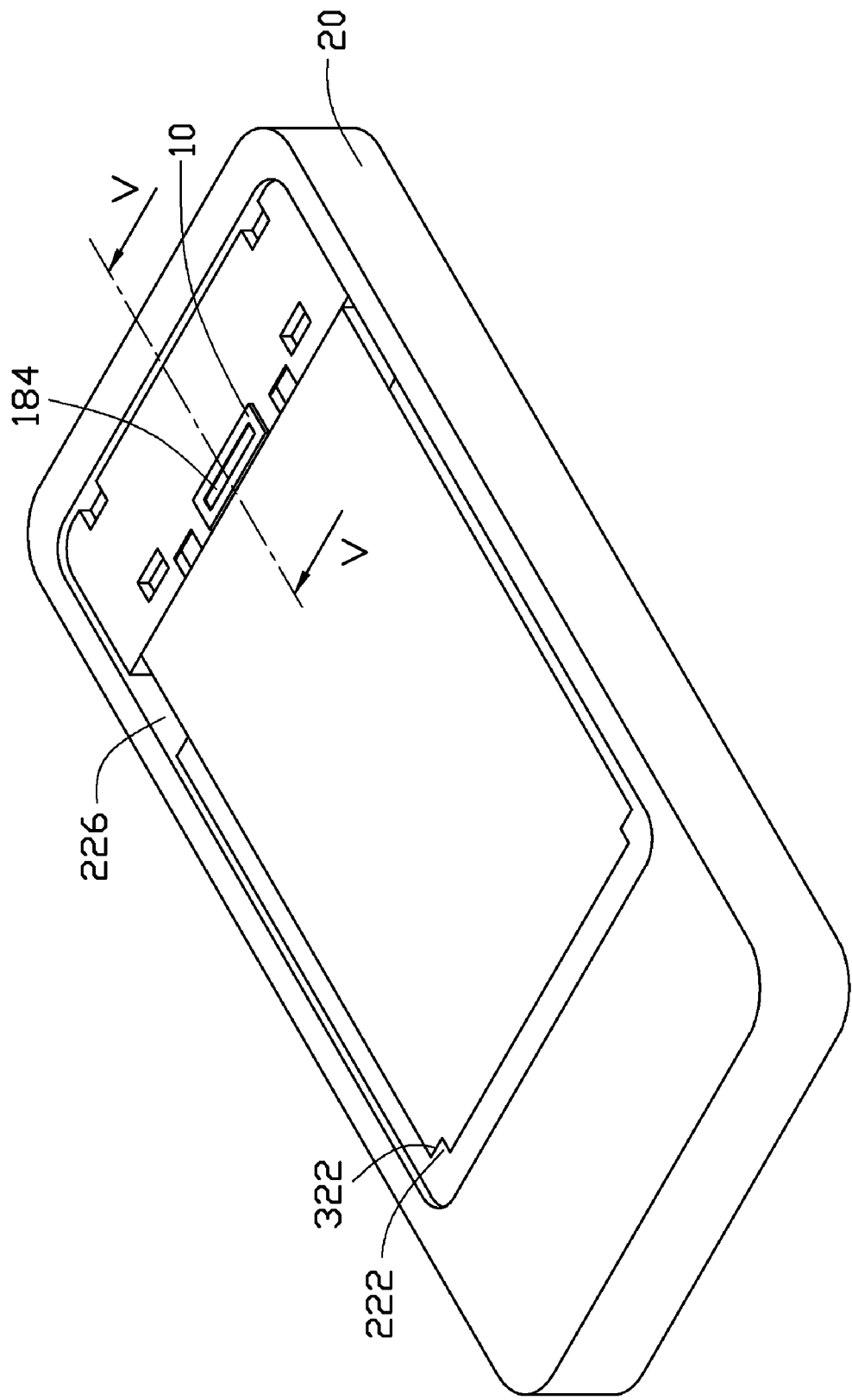
FIG. 5 is a schematic view of the portable electronic device assembled showing a battery in FIG. 1.
Figure 6:
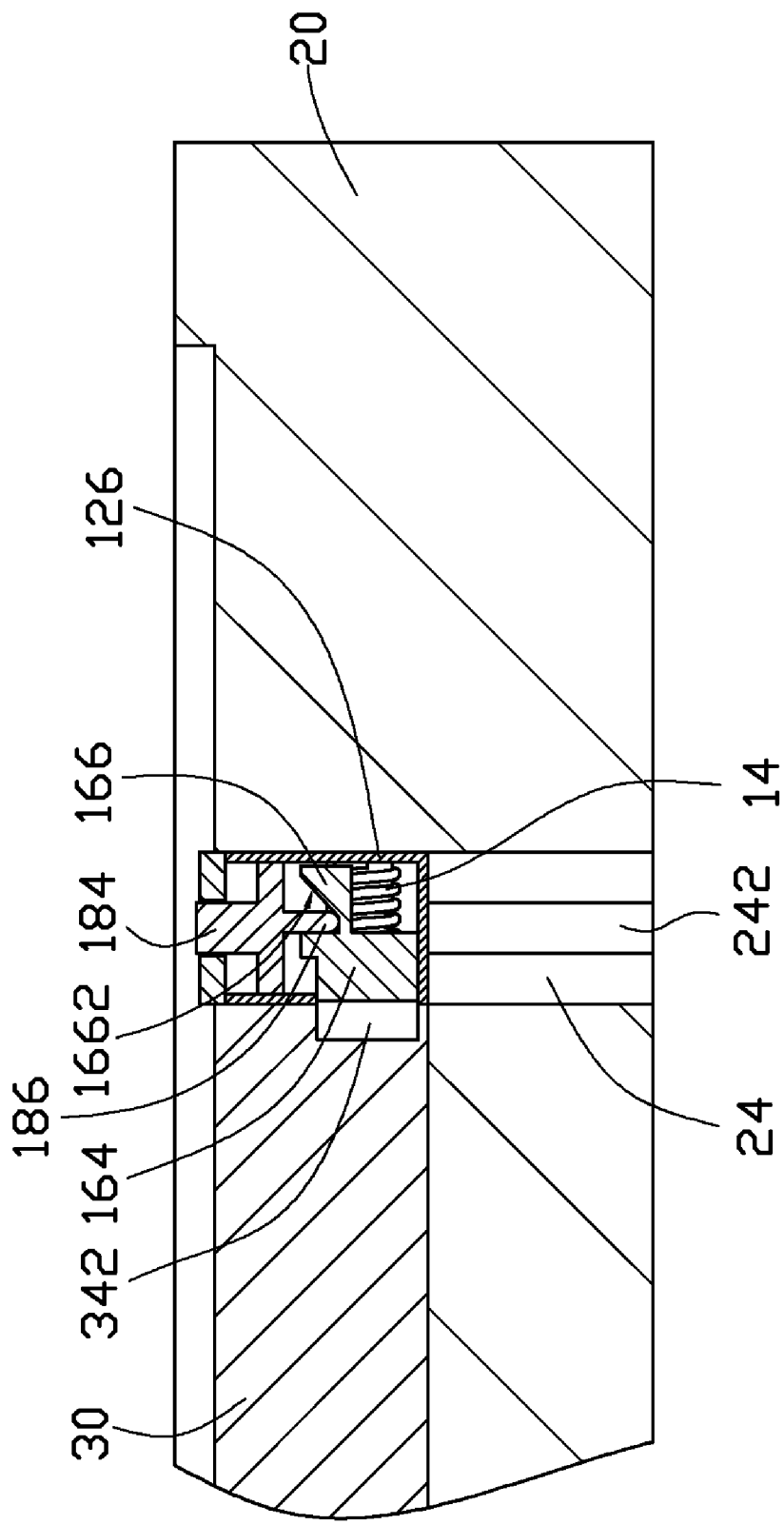
FIG. 6 is partial sectional view along the V-V direction shown in FIG. 5.

Referring to FIGS. 5 and 6, to install the battery 30 into the recess 22 of the housing 20. The pressing portion 184 of the button 18 is pressed downwardly, the resisting portion 186 resists against the slanted plane 1662 of the latching member 16 to urge the latching member 16 to slide toward the first side wall 126. Thus, the protruding block 164 withdraws into the chamber 124 through the hole 1282. Therefore, the battery 30 can be installed into the recess 22 of the housing 10. The holding ribs 222 of the housing 20 are received in the cutouts 322 to hold an end of the battery 30, and the connecting pins 324 of the battery 30 connect with the connectors 224 of the housing 20. Then, the pressing portion 184 is released, causing the elastic members 14 to expand. The protruding block 164 extends into recess 22 to latch with the cavity 342 of the battery 30. Therefore, the battery 30 is latched securely. At the same time, the button 18 slides upwardly and returns to the original position.

To remove the battery 30, the button 18 is pressed downwardly and the latching member 16 withdraws into the chamber 124. Therefore, the unlocked battery 30 can be easily removed from the recess 22 of the housing 20.

It is to be understood that the hood 19 can be omitted, and the button 18 can be latched in the chamber 124 and can slide upwardly or downwardly.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A latching mechanism for a portable electronic device, comprising:
a frame defining a chamber and forming a first side wall and a second side wall, the second side wall defining a hole;
at least one elastic member;
a latching member including a plate portion, a protruding block protruding from a side of the plate portion, and a matching body protruding from another side of the plate portion, the matching body having a slanted plane;
a button including a resisting portion;
wherein the elastic member, the latching member and the button are received in the chamber, the elastic member is compressed between the latching member and the first side wall, the plate portion abuts against the second side wall and the protruding block extends out through the hole of the second side wall, the resisting portion of the button engages with the slanted plane of the matching body, the latching member slides when the button is pressed and the protruding block withdraws into the chamber.

2. The latching mechanism as claimed in claim 1, wherein the first side wall forms at least one post in the inner side to install the elastic member.

3. The latching mechanism as claimed in claim 1, wherein the frame includes two opposite third side walls connecting the first side wall with the second side wall respectively, each third wall forms a protrusion at its outside surface.

4. The latching mechanism as claimed in claim 3, wherein the button includes a base plate, the base plate forms a pressing portion on the top surface and forms the resisting portion on the bottom surface.

5. The latching mechanism as claimed in claim 4, wherein the latching mechanism includes a hood, the hood covers the chamber and engages with the button.

6. The latching mechanism as claimed in claim 5, wherein the hood includes a hood plate and two flanges protruding from the bottom surface of the hood plate, the hood plate defines a slot, the hood is assembled in the frame with each flange resists against the inner side of the third wall correspondingly and the pressing portion of the button passes through the slot.

7. The latching mechanism as claimed in claim 1, wherein the elastic member is a coiled spring.

8. The latching mechanism as claimed in claim 1, wherein the plate portion is slightly larger than the hole of the second side wall in size.

9. A portable electronic device, comprising:
a latching mechanism as claimed in claim 1;
a housing defining a recess to receive a battery, and an receiving groove beside of the recess for assembling the latching mechanism;
wherein the latching mechanism is assembled in the receiving groove, the protruding block of the latching mechanism extends into the recess to latch with the battery, the protruding block unlatches with the battery when the button is pressed.

10. The portable electronic device as claimed in claim 9, wherein the housing includes a first surface and an opposite second surface, the recess is defined in the first surface and the receiving groove runs through the housing and communicates the first surface with the second surface.

11. The portable electronic device as claimed in claim 10, wherein the sidewalls of the receiving groove defines two guiding slits extending from the second surface and not communicating with the first surface, the frame includes two third side walls, each of the third side walls forms a protrusion on an outer surface to engage with a corresponding guiding slit.

12. The portable electronic device as claimed in claim 9, wherein the housing forms holding ribs at an end of the recess, the hold rib has space with the bottom of the recess, the holding ribs are used to hold an end of the battery.

13. The portable electronic device as claimed in claim 9, wherein the housing defines notches at two sides of the recess to remove the battery from the recess.

14. The portable electronic device as claimed in claim 9, wherein the housing forms connector in the bottom of the recess to electronically connect with the battery.

* * * * *